United States Patent [15] 3,707,597

Lunn [45] Dec. 26, 1972

[54] VIDEO BLANKING AND AUDIO MUTING CIRCUIT

[72] Inventor: Lawrence Mark Lunn, Indianapolis, Ind.

[73] Assignee: RCA Corporation

[22] Filed: March 8, 1971

[21] Appl. No.: 121,999

[52] U.S. Cl. .............178/5.8 R, 178/7.5 R, 325/403, 325/456, 325/464, 334/88

[51] Int. Cl. ..............................................H04n 5/44

[58] Field of Search .........178/5.8 R, 7.5 R; 325/390, 325/392, 393, 402, 403, 456, 464, 468, 471; 334/88

[56] References Cited

UNITED STATES PATENTS

| | | | |
|---|---|---|---|
| 3,011,017 | 11/1961 | Oeler et al. | 178/5.8 |
| 3,264,566 | 8/1966 | Kaufman et al. | 325/459 |
| 3,541,240 | 11/1970 | Curtis | 178/7.5 |
| 3,096,397 | 7/1963 | Stachowiak et al. | 178/5.8 |
| 3,018,326 | 1/1962 | Petrick et al. | 178/5.8 |

*Primary Examiner*—Richard Murray
*Assistant Examiner*—Peter M. Pecori
*Attorney*—Eugene M. Whitacre

[57] ABSTRACT

The described switching circuit blanks the picture and mutes the sound of a television receiver during its channel selection tuning, either manually or automatically by remote control. The picture blanking function is accomplished by operating on the brightness limiter circuit of the receiver to decrease the brightness control bias coupled to the video signal chain, while the sound muting function is accomplished by operating on a current splitter to attenuate the signal drive coupled to the receiver's audio output circuit.

8 Claims, 6 Drawing Figures

INVENTOR.
Lawrence M. Lunn
BY
Charles Brodsky
ATTORNEY

INVENTOR.
Lawrence M. Lunn
BY
Charles Bradley
ATTORNEY

INVENTOR.
Lawrence M. Lunn
BY Charles Brodsky
ATTORNEY

VIDEO BLANKING AND AUDIO MUTING CIRCUIT

BACKGROUND OF THE INVENTION

1. Field of the Invention

This invention relates to television receivers, in general, and to a circuit for blanking its picture and muting its sound on tuning to undesired channels, in particular.

2. Description of the Prior Art

Circuits of this general nature have been described in the prior art. Typical of such circuits are those disclosed in U.S. Pat. No. 3,011,017 to Oeler, U.S. Pat. No. 3,096,397 to Stachowiak and U.S. Pat. No. 3,131,255 to DiNardo. Each of these patents point out the desirability of disabling either or both of the television picture and sound apparatus during channel selection. As is now well appreciated, such disabling serves to eliminate any unpleasant picture flickering or sound increase during the time interval between loss of one desired signal and retention of another.

The systems described in the above-noted patents operate in an environment where power tuning is incorporated to switch between the program channels on the receiver. Each arrangement includes a motor cooperating with the television tuner to automatically change channels in response to a remote control order. Such operation of the energized motor causes various receiver connections to be interrupted—for example, to permit the cathode of the television kinescope to rise to a cutoff potential that will blank the picture tube image and to open circuit the energizing potentials applied to the sound system. Manual channel selection, on the other hand, —as in U.S. Pat. Nos. 3,011,017 and 3,131,255—prevents the energization of the motor and defeats the video blanking and sound muting features theretofore provided. Not all receivers are equipped for remote control operation, however, but incorporate similar apparatus as automatic gain control systems which respond to the loss of signal on unprogrammed channels to produce such interference as the energizing motor seeks to eliminate in the remote control set.

SUMMARY OF THE INVENTION

As will become clear hereinafter, the present invention is directed to a circuit which responds to rotations in the mechanical tuner of the receiver to effect the blanking and muting actions for all unprogrammed channels, independently of whether the rotation is afforded through manual or remote control means. As such, the arrangement is useful in either class of receiver, since all that is necessary is for the arrangement of the tuner to provide a set of switching contacts for use in channel programming. Closure of such contacts for an undesired channel can serve to blank the video picture or mute its sound in any appropriate manner—such as by decreasing the brightness control bias coupled to the video signal chain and by attenuating the amount of signal drive applied to the audio output circuits of the receiver. This configuration can thus sense the tuner conditioning rather than the conditioning of the remote powered motor and, as such, can comprise a switching network which is relatively simple to construct and substantially universal in its application. The arrangement to be described will be seen to operate upon the closure of such switching contacts to bias the brightness limiter transistor from its saturated condition to a nonconducting condition, and to change the bias on an electronic attenuator which performs the volume control function in the receiver.

BRIEF DESCRIPTION OF THE DRAWINGS

These and other advantages of the invention will be more readily apparent from a consideration of the following description taken in connection with the accompanying drawings in which.

DETAILED DESCRIPTION OF THE DRAWINGS

Figure 1A:
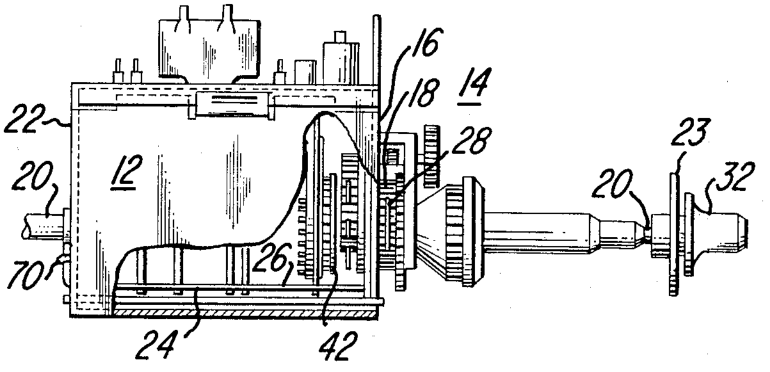
FIGS. 1*a*–1*d* schematically show portions of a television tuner having a switch arrangement useful in carrying out the video blanking and sound muting functions of the present invention.

The television tuner 12 shown in FIG. 1 may be of the detent type, having a gear assembly 14 mounted on its front plate 16. The gear assembly conventionally includes an index wheel 18 having a plurality of detents and positioned on a channel selecting shaft 20 which passes through the front plate 16 and a rear plate 22. A torsion spring detent 24, including an intermediate portion 26 extending parallel to the channel selector tuning shaft 20 and a right angle portion 28, engages the index wheel 18 to cause detent action during channel changes. Specifically, one end of the right angle portion 28 has a bend 30 which resiliently engages the detent of the index wheel 18.

When the tuner channel selection knob 32 is rotated, the shaft 20 to which it is joined rotates, causing the index wheel 18 to rotate and cause a re-arrangement of the electrical components within the tuner, to tune it to a desired channel. The torsion spring detent 24 during the rotational movement rides on the periphery of the index wheel 18, thereby effectuating a detent action to provide indexing of the channel selection shaft.

Figure 1B:
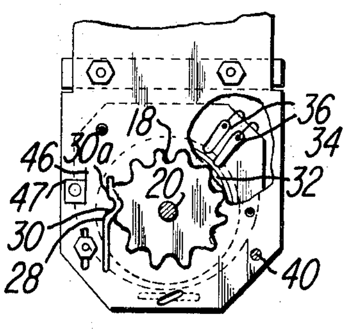

Internal to the tuner are a series of rotary switches, best shown in FIG. 1*b*, which interconnect the electrical components of the tuner associated with each of the detent or channel positions. The rotary switches, only one of which is shown, include a rotor portion 32 which is secured for rotation with the channel selecting shaft 20. On the periphery of the rotor 32 are a series of rotor contacts 34 which are adapted to engage stator contacts 36 such that rotation of the rotor 32 to different detent positions bring different ones of the rotor contacts 34 into engagement with the stator contacts 36. Such tuner is generally of the step-by-step channel-tuning variety having detent-controlled channel selector stop positions over a full 360° rotation of the tuning shaft 20, for each of the 12 VHF-band channels and for the UHF channel band. A movable manual control element or ring 23 is also fitted onto the tuning shaft 20 and connects with the interior operating mechanism of the tuning system for longitudinal movement toward and away from the front plate 16, in addition to rotation in either direction. In particular, rotation of the control 23 when moved toward the front plate 16, serves to provide fine tuning, preset turning and programming adjustments of the system for the VHF band of signal frequencies.

Figure 1C:
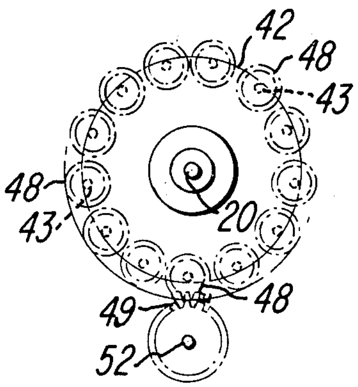
Figure 1D:
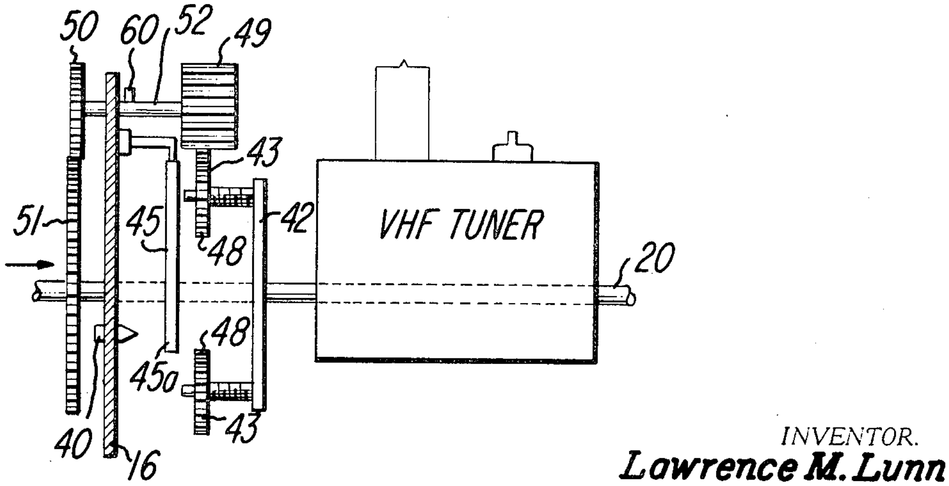

To accomplish such functions, the tuner is also provided with a 13-position turret 42 which is mounted on the tuning shaft 20 between the front plate 16 and back plate 22, as indicated in FIG. 1c. This turret carries 13 rotatable fine tuning or tuning adjustment screws 43, extending through the turret in a circular row near the periphery thereof and angularly spaced and in parallel relation to each other. As the turret 42 rotates with the tuning shaft 20 through the various tuning positions for Channels No. 2–13, the tips of 12 of the 13 tuning screws progressively come under one end of a fine tuning control lever 45 of the tuner (FIG. 1d) to move it to different positions for fine tuning such channels. The tip of the 13th tuning screw also comes under the control lever 45 for use in bypassing the UHF channel if desired, as when no such channel is operative in the viewer's geographical listening area. The heads 48 of the tuning screws 43 are pinion-gears which, when turned clockwise or counter-clockwise by a fine tuning gear 49, move the screws out or in with respect to the tuning lever. The opposite ends of the tuning screws cooperate as a fine-tuning plunger with internal fine tuning means (not shown), to thus adjust the fine tuning of the VHF channels at each stop position. As indicated, rotation of the fine tuning gear 49 is effected through corresponding movement of gears 50, 51 brought about by rotation of the tuning shaft 20 when moved toward the front plate 16 and by corresponding rotation of the connecting shaft 52.

In accordance with the teachings of the present invention, the fine tuning control lever 45 has a lip portion 45a positioned under a screw 40 which is electrically connected to the tuner front plate which is electrically grounded. The other end of the lever is electrically coupled to a terminal post 60, connected to the various components of the blanking and muting circuit as described below. Pushing in on the control 23 and rotation of it in a counter-clockwise direction moves the pinion gear heads 48 towards physical contact with the tuning control lever 45 to move lip portion 45a to contact the grounded screw 40. The channel associated with such gear head 48 is thus an undesired or unprogrammed channel and, as will be seen hereinafter, causes the television picture to blank and its sound to mute when tuning to such undesired channel. Rotation of the control 23 in the clockwise direction, however, moves the pinion gears away from the lever 45, to prevent the grounding of the fine tuning components of the tuner associated therewith in pre-programing desired channels. This lever arm-screw arrangement corresponds to the programming switch $S_P$ in the following description and, as described below is electrically coupled to a rectifier component operative in determining the bias for the brightness limiter transistor and to a control transistor operative in providing a bias for controlling the electronic attenuation of the audio signal drive.

Tuners of this general type—but without the described lever arm arrangement for effecting the short-circuiting to ground for undesired program signals--are more fully illustrated as the KRK140 tuner in the Television Service Data Sheet, File 1970, No. T14, published by the RCA Sales Corporation.

Figure 2:
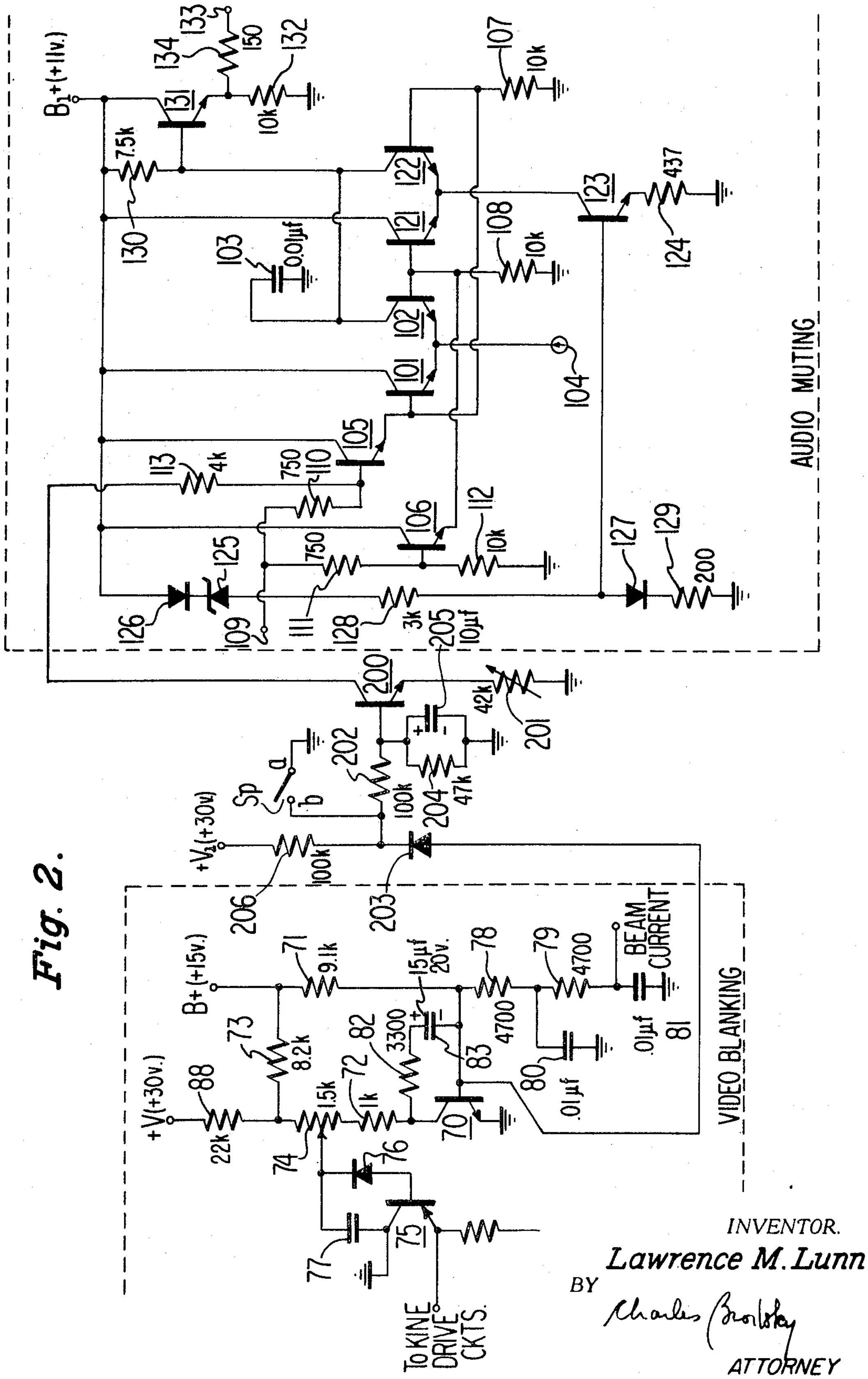
FIG. 2 illustrates a circuit for performing these functions according to the invention.

The configuration of FIG. 2 illustrates the schematic circuit according to the invention for blanking the television picture and muting its sound on unprogrammed channels—for example, those which do not transmit into the geographical area where the receiver is located. As indicated, those elements located outside of the dotted lines constitute components of the blanking and muting circuit of the invention, while those components within such dotted line constructions represent components of the video and audio output stages of the receiver, for example, which are controllable to eliminate the flickering of picture and rush of sound otherwise obtainable without such controlled operations.

As shown, the brightness (or automatic beam current) limiter includes a transistor 70 having an emitter electrode directly connected to a point of reference or ground potential and a base electrode coupled to a source of regulated B+ voltage via a resistor 71. The collector electrode of transistor 70 is also coupled to the B+ source, by means of a series connection including resistors 72 and 73 which respectively couple to opposite terminals of the included brightness control potentiometer 74. The variable arm of the control 74 is coupled, in turn, to the base electrode of a second video amplifier transistor 75 through a DC restorer circuit including a semiconductor rectifier 76 having its anode electrode directly connected to the base electrode of transistor 75 and its cathode electrode coupled by a capacitor 77 to the collector electrode of that transistor. The emitter electrode of transistor 75 is, in turn, coupled to the video drive circuits for the red, green, and blue electron guns of the cathode-ray kinescope employed in a color television receiver, for example, in appropriate manner. As shown, the collector electrode of transistor 70 is additionally coupled to a source of operative potential +V via a resistor 88 connected at its other end to the junction of resistor 73 with potentiometer 74.

A pair of resistors 78, 79 serially couple the base electrode of transistor 70 to a point in the receiver circuitry at which the picture tube beam current may be detected, with the junction of these two resistors being coupled to ground by a first capacitor 80 and with the point of beam current sensing being further coupled to ground by a second capacitor 81. Capacitor 81 cooperates with the effective impedance at this beam current sensing point to form an R-C filter which reduces any horizontal rate modulation which may exist on the beam current flow, while the combination of resistors 78 and 79 together with capacitor 80 forms a second filter to further reduce the horizontal rate modulation as well as any vertical rate modulation which might be existent on the beam current flow. Since 180° of phase shift may be introduced by such filter networks—and because such phase shift can cause oscillations to limit beam current flow—the configuration further includes a resistor 82 and a capacitor 83 serially coupled between the collector and base electrodes of transistor 70, to cancel the effects of such phase shift by lowering the AC gain of the circuit.

In operation, the resistor 71 coupling the base electrode of transistor 70 to the regulated supply source normally maintains that transistor in saturation for the typical values of collector resistors illustrated. With the emitter electrode of transistor 70 grounded as shown, the current flowing into the base electrode of transistor 70 will be substantially equal to the difference between the value of the B+ source and the base-to-emitter offset voltage of the transistor, divided by the resistance value of resistor 71. This is the value of base current which would flow, for example, when the brightness control 74 is adjusted to just cut-off the picture tube beam current. The current flowing through resistors 78, 79 to the beam current sensing point, in this instance is thus substantially zero. As the brightness control 74 is advanced to initiate beam current flow, the amount of current flowing to such point increases at the expense of the base current flow to transistor 70, although the total current through resistor 71 remains substantially unchanged. As the brightness control 74 is continually advanced to increase picture tube beam current, less and less base current flows through transistor 70 until a point is reached at which that transistor is brought out of saturation. Such point depends upon the forward current gain characteristic of transistor 70, and typically may be reached when the current flow to the base electrode is of the order of 0.1 milliamperes for the values shown, where the current flowing through resistor 71 is of the order of 1.3 milliamperes. The 1.2 milliamperes of current flowing through resistors 78, 79 at this time represents the beam current limit since further adjustment of the brightness control 74 decreases the base current flow of transistor 70 all the more, to turn that transistor "off" and in a direction which increases its collector electrode voltage and decreases the effective voltage at the variable arm of the brightness control. The picture tube beam current is thus automatically limited to this 1.2 milliampere value or so, as further attempts at its increase dynamically decreases the brightness control bias applied to the video amplifier transistor 75.

The audio signal control stage comprises a current-splitting type of electronic attenuator, the output of which is direct voltage stabilized. As shown, the attenuator comprises a pair of transistors 101, 102, with the collector electrode of the first of these transistors being coupled to a second source of regulated voltage $B_1$+ and with the collector electrode of the second of these transistors coupled to ground by a capacitor 103. The emitter electrodes of transistors 101, 102 are coupled together to receive a current signal from a source 104 representative of audio signal information, while the base electrodes of each transistor is shown as being biased from the emitter electrodes of two additional transistors, 105, 106. In particular, the base electrode of transistor 101 is coupled to the junction of the emitter electrode of transistor 105 and an added resistor 107 (referenced to ground) while the base electrode of transistor 102 is correspondingly coupled to the junction between the emitter electrode of transistor 106 with a second resistor 108 (also referenced to ground). The collector electrode of transistors 105, 106 are each coupled to the $B_1$+ voltage source while a bias voltage is additional applied to each of the respective base electrodes—from a terminal 109 to transistor 105 via a resistor 110 and to transistor 106 via a resistor 111 which forms part of a voltage divider with a resistor 112 coupled to ground. A resistor 113 couples the base electrode of transistor 105 to a point of direct voltage, as described below, while the capacitor 103 provides the necessary de-emphasis for the circuit.

The direct voltage compensation for the audio signal developed at the collector electrode of transistor 102 is provided by a second pair of emitter coupled transistors 121, 122. As shown, these emitter electrodes are coupled to the collector electrode of a further transistor 123, the emitter electrode of which is returned to ground via a resistor 124 while the base electrode of which is coupled to receive a temperature compensated bias voltage from a point in a series network including a zener diode 125, a pair of similarly poled rectifiers 126, 127 and a pair of resistors 128, 129, coupled as illustrated between the $B_1$+ regulated voltage source and ground. Also coupled to this regulated $B_1$+ voltage is the collector electrode of the transistor 121, whose base electrode is shown directly connected to the corresponding base electrode of transistor 102. In similar manner, the base electrode of transistor 122 is directly connected to the corresponding electrode of the transistor 101, but its collector electrode is returned to the $B_1$+ source via a further resistor 130. Lastly, the collector electrode of the transistors 102, 122 are directly connected, to provide the direct voltage compensation described below.

A buffer stage is also included, to couple the output of the attenuator to the audio driver circuits of the receiver. To this end, a transistor 131 is included, having a base electrode connected to the junction of resistor 130 and transistor 102, and a collector electrode directly connected to the $B_1$+ voltage source. The emitter electrode of transistor 131 is shown as being coupled to ground by a resistor 132 and to an output terminal 133 by a resistor 134. The audio driver circuits will be understood as being coupled to this last-named terminal.

In operation, any increase in the bias potential at the base electrode of transistor 105 increases the amount of current which flows from the source 104 through transistor 101, at the expense of the current flow from the source 104 through the transistor 102. The decrease in current flow through transistor 102 thus develops a smaller signal across resistor 130 and a consequently smaller signal at terminal 133. The increase in bias voltage at the base electrode of transistor 101, however, is translated to the base electrode of transistor 122, to cause an increase in current flow from transistor 123 through the load resistor 130. This increase is in a direction to stabilize the direct voltage at the base electrode of transistor 131 so that even though the signal amplitude at terminal 133 may decrease, its direct voltage level will be maintained substantially constant. Any decrease in the bias potential at the base electrode of transistor 105, on the other hand, has the effect of increasing the current through transistor 102 from the source 104 and decreasing the amount of attenuation provided by the current-splitting transistors 101, 102. The decrease in current which flows from transistor 123 through transistor 122 due to the decreased bias on transistor 122 again serves to stabilize the direct voltage at the base electrode of transistor 131, and at the output terminal 133. The direct voltage at the base electrode of transistor 105 thus determines the amount of attenuation which these components provide.

It will be readily appreciated that the foregoing descriptions of the automatic beam current limiter and the current-splitting of the attenuator are exhibited in the absence of any control signal directing that the picture be blanked or the sound muted. As will be seen immediately below, such a control signal is generated by the circuit of the invention first, to reduce the bias to the brightness limiter transistor 70 to render it nonconductive and second, to increase the bias applied to transistor 101 to divert substantially all the current from the source 104 away from the transistor 102 and its load resistor 130. Thus, the video blanking and audio muting circuit of the invention includes a transistor 200 having an emitter electrode coupled to ground by a variable resistor 201 and having a collector electrode coupled to resistor 113 of the audio attenuator circuit. The base electrode of transistor 200 is coupled by a resistor 202 to the cathode electrode of a rectifier 203, the anode electrode of which is coupled to the base electrode of the brightness limiter transistor 70. Also coupled to the base electrode of transistor 200 are a resistor 204 and a capacitor 205, each of which is referenced to ground, as shown. A resistor 106 couples the cathode electrode of rectifier 203 to a source of operating potential $+V_1$, while the programming switch of the afore-described tuner has one of its contacts *a* coupled to ground and a second of its contacts *b* coupled to the junction of resistor 202 and rectifier 203. Variable resistor 201 serves as the volume control potentiometer for the audio circuitry and will be seen to vary the direct voltage at the base electrode of transistor 105 when transistor 200 is saturated to achieve the above-described signal splitting effect.

In operation — and with the values as illustrated — the voltage developed at the junction of resistor 202 and rectifier 203 is sufficiently positive to reverse bias the latter when the tuner is rotated to select a programmed channel. In such instance, the programmed switch $S_P$ is open-circuited, and the operation of the brightness limiter circuit continues in the manner previously described. At the same time, the voltage developed at the base electrode of transistor 200 is sufficiently positive to place transistor 200 into saturation, which allows control of the bias applied to the base electrode of transistor 101 in the audio attenuator by means of resistor 201. When the tuner is rotated to an undesired program, on the other hand, the programming switch $S_P$ closes, thereby grounding the junction of resistor 202 and rectifier 203. Rectifier 203 thus become forward biased and takes transistor 70 out of saturation and renders it nonconductive. The increase in its collector electrode voltage which results will be seen to be in a direction to render transistor 75 also nonconductive—such that with an appropriate number of amplifier stages in the video chain, can result in a blanking of the cathode-ray kinescope. In similar manner, the grounding at the junction of resistor 202 and rectifier 203 renders transistor 200 nonconductive, with the effect that the rising collector electrode voltage which results substantially increases the base electrode voltage of transistor 101 in such a manner that substantially zero current flows from the source 104 through transistor 102 to its output load resistor 130. It will be appreciated that the absence of signal current through the load resistor 130 thus eliminates all audio information during these unprogrammed channels.

Figure 3:
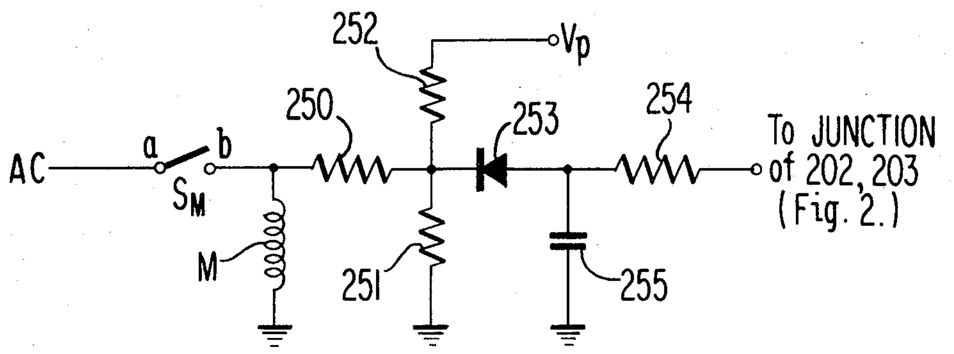
FIG. 3 shows an arrangement for operating the configuration of FIG. 2 by remote control.

One important feature of the disclosed invention is that it can operate either independently of, or in connection with, a remote control mechanism. Thus, the described circuit can find usefulness both in those receivers which care equipped for remote power tuning as well as those designed solely for manual tuning. One such remote control mechanism is illustrated in FIG. 3, and is particularly attractive in that audio muting and video blanking are provided when the motor is activated. As shown, the motor is represented by a winding M serially coupled between the terminal *b* of the remote control switch $S_M$ and ground. One end of a resistor 250 is also coupled to this contact *b*, while its other end is connected to ground through a resistor 251, on the one hand, and to a source of positive direct potential $V_P$ by a resistor 252, on the other hand. The cathode electrode of a rectifier 253 is connected to the junction of resistors 250–252, while the anode electrode of the rectifier 253 is coupled to the junction of resistor 202 and rectifier 203 of FIG. 2 via a further resistor 254. A capacitor 255 is included to couple the junction of rectifier 253 and resistor 254 to ground.

As will be seen, when the switch $S_M$ is in its open position, the circuit disclosed in FIG. 2 will operate as therein described since the motor M is not energized. Rectifier 253, in this instance, is reverse biased by the voltage divider comprising resistors 250–252 (neglecting the DC resistance of the motor M), and is thus an open circuit. When the switch $S_M$ is closed, however, rectifier 253 and capacitor 255 function is a half wave rectifier with respect to an alternating potential applied to contact *a* of the switch $S_M$, to produce by filtering, a negative voltage which is applied through resistor 254 to the junction of resistor 202 and rectifier 203. Resistors 250, 251 of this arrangement are selected such that the negative voltage produced when the switch $S_M$ is closed is of sufficient negative value to forward bias the rectifier 203 and render transistor 200 nonconductive as will accomplish the audio muting and video blanking operations described. Since resistors 250, 251 are selected to provide the proper negative voltage, resistor 252 is selected of a value to reverse bias the rectifier 253 when the switch $S_M$ is opened. The value of resistor 254, on the other hand, is chosen to cooperate with the resistors of the blanking and muting circuit to bias off both the audio and video stage when the motor switch $S_M$ is closed.

While there has been described what is considered to be a preferred embodiment of the present invention, it will be evident that other modifications—such as changes in rectifier and transistor polarities—supply voltage polarities—and connection to appropriate electrodes of the audio and video stages—may be made by those skilled in the art. It is therefore contemplated that the appended claims be read in the true spirit and scope of the teachings disclosed herein. Thus, it will be seen that the described embodiment attains the video blanking function by decreasing the bias voltage at the variable arm of the brightness limiter control potentiometer when an unprogrammed channel is selected to substantially the same voltage as is there developed when the potentiometer is adjusted to its minimum setting when a programmed channel is received—namely, zero volts. In similar manner, the described embodiment attains the audio muting function by developing its control signal for an undesired channel selection to cut off the signal drive to the audio output circuits. Whereas the control signal developed by the circuit of the invention might also be utilized to disable directly the video and audio output stages of a television receiver, the disclosed scheme proves attractive in those constructions where both the video output and sound output stages are incorporated as part of a miniaturized circuit design of a type which makes available only a limited number of terminals for connection to their internal components. Such arrangement for the video and sound output circuits exists in the CTC-46 color television receiver manufactured by the RCA Sales Corporation. The arrangement described herein proves particularly attractive in such receiver construction in that its control signal can be applied to the brightness limiter (which is not fabricated in either integrated circuit or ceramic circuit miniaturized form) and to an available terminal already existing on a ceramic circuit module for the sound control.

What is claimed is:

1. In a television receiver employing an audio output stage including a sound reproducing device responsive to applied audio frequency signals, a video output stage including an image reproducing kinescope in which beam current flows as a function of the setting of an included brightness control coupled to vary a bias voltage on an electrode thereof, first apparatus for varying the amplitude of audio frequency signals within said audio output stage for application to and reproduction by said device according to individual viewer preference, second apparatus, operable with said image reproducing kinescope, for limiting the beam current which flows as said brightness control is varied to a predetermined level, and a detenting channel selector, the combination therewith of:

transistor means coupled to said first apparatus and operative to reduce the amplitude of audio frequency signals within said output stage in response to a first provided control signal to correspondingly reduce the amplitude of signals applied to said sound reproducing device in a direction to de-activate said device;

rectifier means coupled to said second apparatus and operative to reduce the level to which said beam current can flow as said brightness control is varied in response to a second provided control signal to correspondingly reduce the resultant bias on said kinescope electrode in a direction to de-activate said image reproducing kinescope; and switch means operative in conjunction with said detenting channel selector to provide at least one of said first and second control signals when said selector is changed to an unprogrammed channel.

2. The combination of claim 1 wherein said first means includes a transistor having base, emitter and collector electrodes, and which is relatively ineffective in reducing the amplitude of audio frequency signals within said output stage in the absence of said first control signal but which substantially reduces the amplitude of said audio frequency signals when said first control signal is provided and applied to its base electrode and its emitter and collector electrodes are coupled in circuit with said first apparatus.

3. The combination of claim 2 wherein said first apparatus includes a manually controllable attenuator circuit for developing said audio frequency signal for application to said sound reproducing device in accordance with said viewer preference, and wherein the emitter electrode-collector electrode current path of said transistor is coupled serially to said attenuator circuit to electronically reduce the amplitude of audio frequency signals within said output stage to correspondingly reduce the amplitude of said applied signal in a direction to de-activate said sound reproducing device when said first control signal is provided and applied to the base electrode of said transistor.

4. The combination of claim 1 wherein said second means includes a rectifier having anode and cathode electrodes, and being in a first conductive condition to be relatively ineffective in reducing the level to which said beam current can flow as said brightness control is varied and the resulting bias on said kinescope electrode in the absence of said second control signal but being in a second conductive condition to substantially reduce said level and said resultant bias on said kinescope electrode when said second control signal is provided and applied to its cathode electrode.

5. The combination of claim 4 wherein said second apparatus includes a beam current limiter circuit having a manual control coupled to said kinescope electrode and wherein the anode electrode of said rectifier is coupled to said beam current limiter circuit to electronically reduce the voltage at said control and the bias on said kinescope electrode to deactivate said image reproducing kinescope when said second control signal is provided and applied to the cathode electrode of said rectifier.

6. The combination of claim 1 wherein said switch means operates in conjunction with said detenting channel selector to provide both said first and second control signals when said selector is manually changed to an unprogrammed channel.

7. The combination of claim 3 wherein the emitter electrode of said transistor is coupled to a manually controllable attenuator circuit, wherein the base electrode of said transistor is coupled to a point of reference potential by a second resistor and to a source of bias potential by third and fourth resistors coupled in series, and wherein said switch means provides said first control signal to the junction of said third and fourth resistors for causing a change in the voltage developed at the collector electrode of said transistor in a direction to reduce the amplitude of audio frequency signals coupled by said attenuator circuit to said sound reproducing device.

8. The combination of claim 5 wherein the cathode electrode of said rectifier is coupled by a first resistor to a source of bias potential which reverse biases said rectifier, and wherein said switch means provides said second control signal to the cathode electrode of said rectifier to forward bias said rectifier and cause a change in the voltage developed at said brightness limiter control in a direction to reduce the bias voltage coupled by said control to said kinescope electrode.

* * * * *

UNITED STATES PATENT OFFICE

CERTIFICATE OF CORRECTION

Patent No. 3,707,597 Dated 12-26-72

Inventor(s) Lawrence Mark Lunn

It is certified that error appears in the above-identified patent and that said Letters Patent are hereby corrected as shown below:

Column 2, Line 65 - change "preset turning" to -- preset tuning --.

Column 7, Line 22 - change "106" to -- 206 --.

Column 8, Line 5 - change "care" to -- are --.

Column 8, Line 31 - change "is" to -- as --.

Signed and sealed this 10th day of July 1973.

(SEAL)
Attest:

EDWARD M. FLETCHER, JR.
Attesting Officer

Rene Tegtmeyer
Acting Commissioner of Patents

FORM PO-1050 (10-69)
3530 6|72

USCOMM-DC 60376-P69
☆ U.S. GOVERNMENT PRINTING OFFICE : 1969 O—366-334